United States Patent [19]

Sorensen

[11] Patent Number: 5,673,960
[45] Date of Patent: Oct. 7, 1997

[54] PROTECTIVE LIFTGATE COVER

[75] Inventor: Mark L. Sorensen, Treynor, Iowa

[73] Assignee: Omaha Standard, Inc., Council Bluffs, Iowa

[21] Appl. No.: 712,769

[22] Filed: Sep. 12, 1996

[51] Int. Cl.⁶ ............................................. B60R 13/02
[52] U.S. Cl. ................ 296/136; 296/39.1; 296/57.1; 280/770
[58] Field of Search ..................... 296/136, 39.1, 296/57.1, 61, 62; 280/770

[56] References Cited

U.S. PATENT DOCUMENTS

| | | |
|---|---|---|
| 2,729,347 | 1/1956 | Jorgensen . |
| 2,850,187 | 9/1958 | Roberts ................. 296/57.1 |
| 2,992,011 | 7/1961 | Becan . |
| 3,096,601 | 7/1963 | Henry-biabaud .......... 296/39.1 |
| 3,175,707 | 3/1965 | Mathers . |
| 3,674,167 | 7/1972 | Roberts . |
| 3,874,527 | 4/1975 | Royce . |
| 4,078,818 | 3/1978 | Donnelly . |
| 4,813,842 | 3/1989 | Morton ................... 296/57.1 |
| 4,907,936 | 3/1990 | Boudage . |
| 4,968,084 | 11/1990 | Asher et al. ............... 280/770 |
| 5,033,931 | 7/1991 | Mann ..................... 296/57.1 |
| 5,257,894 | 11/1993 | Grant . |

FOREIGN PATENT DOCUMENTS 2128565  5/1984  United Kingdom ............... 296/39.1

*Primary Examiner*—Gary C. Hoge
*Attorney, Agent, or Firm*—Adam H. Jacobs

[57] ABSTRACT

A protective liftgate cover for covering and protecting the ground-engaging lower face of a liftgate platform includes a generally rectangular plate of a size and shape to fit over and generally complete cover the lower face of the liftgate platform. A lower flange and at least one side flange are mounted on the plate adjacent a respective lower and side edge for contacting the lower and side edges of the liftgate platform, thereby protecting those elements of the platform. At least one ground-engaging foot is mounted on the outer surface of the plate for contacting and engaging the ground surface and the plate is secured to the liftgate platform by one or more fastening devices. The liftgate cover thus provides protection for the lower face of the liftgate platform.

15 Claims, 3 Drawing Sheets

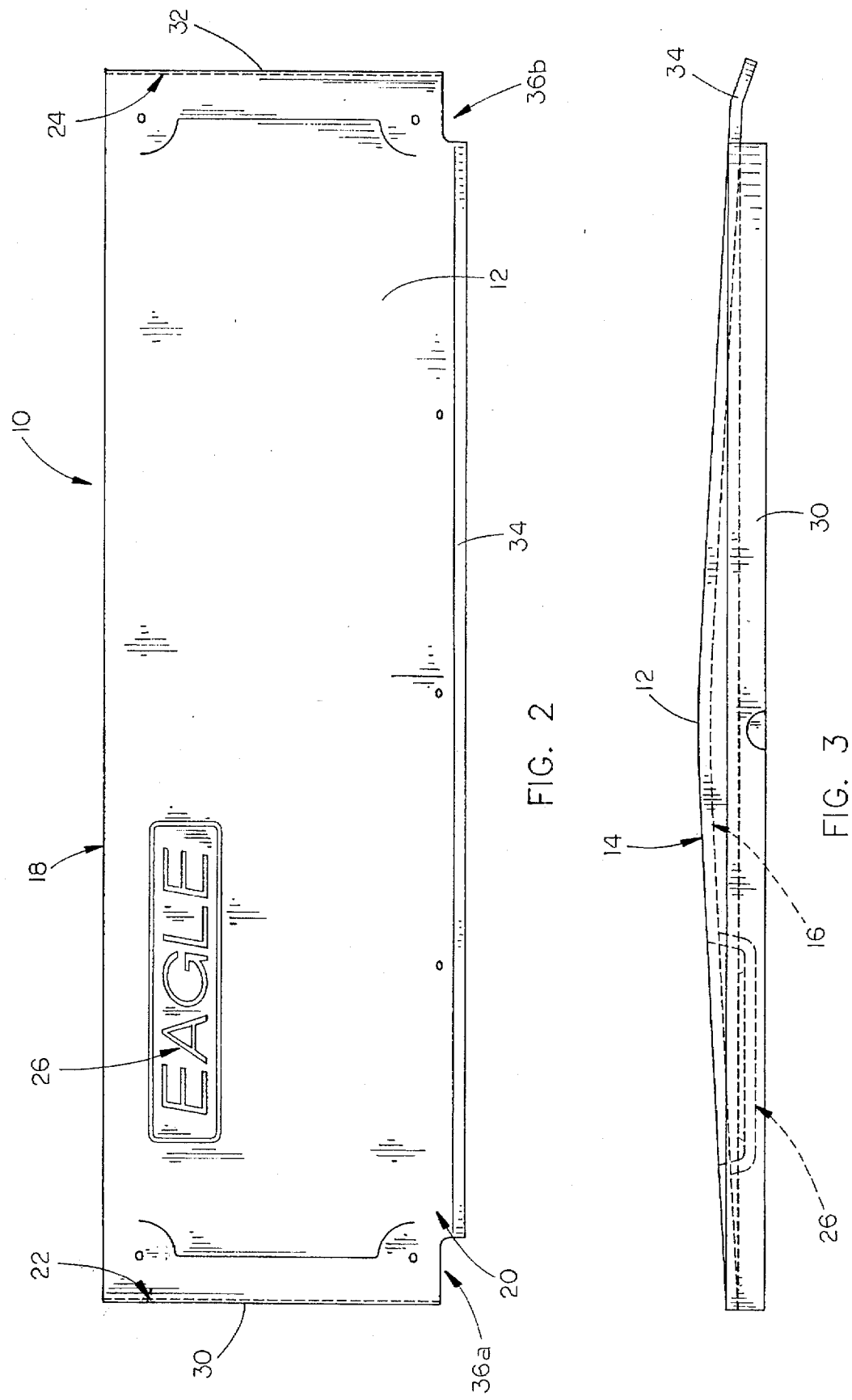

PROTECTIVE LIFTGATE COVER

BACKGROUND OF THE INVENTION

1. Technical Field

The present invention is directed to protective covers for liftgates and, more particularly, to a protective liftgate cover which includes a generally rectangular plate of a size and shape to fit over and generally cover the lower face of a liftgate platform, a lower flange and at least one side flange mounted on the plate for seating the plate on the liftgate platform, at least one ground-engaging foot mounted on the plate and a plurality of fastening devices for securing the plate to the lower face of the liftgate platform.

2. Description of the Prior Art.

Liftgates have been used on cargo-carrying vehicles for many years. A liftgate commonly includes a mounting structure affixed to the vehicle at the rear or side of the vehicle, a lifting platform commonly consisting of a large steel plate and a lifting device such as an hydraulic cylinder for raising and lowering the lifting platform to allow for easy loading and unloading of cargo from the vehicle. One of the most common types of liftgates currently being used are those including a liftgate platform which may be pivoted between an upright position and a horizontal position, so that the liftgate platform closes the rear opening of the bed of the truck when in an upright position. When such a liftgate is being used to load and unload cargo from the vehicle, the rear/lower face of the liftgate repeatedly rests on and contacts the ground surface on which the vehicle is stuck on. This repeated contact with the ground surface can cause damage to the rear/lower face of the liftgate platform, removing and chipping paint therefrom and causing scratches to the platform face which can result in areas of rust development and general degradation of the liftgate platform. The end result is the eventual need for replacement of the entire liftgate platform, or at the very least the refinishing and repainting of the rear/lower face of the platform. There is therefore a need for a protective liftgate cover which will prevent such damage to the rear/lower face of the liftgate platform.

It is also important that any such cover for a liftgate platform be extremely durable and weather-resistant, as the cover will be exposed to the elements at all times. While a metal liftgate cover will serve the function of preventing damage to the liftgate platform, the same problems described above with the liftgate platform would be reprised with the use of a metal liftgate cover. There is therefore a need for a liftgate cover which utilizes an easily-shaped material having both properties described above.

Therefore, an object the present invention is to provide a protective liftgate cover which will completely cover and protect the rear/lower surface of a liftgate platform.

Another object of the present invention is to provide a protective liftgate cover having a generally rectangular plate with a lower flange and at least one side flange mounted thereon, the lower flange and side flange cooperating to seat the plate on the rear/lower face of the liftgate platform.

Another object of the present invention is to provide a protective liftgate which includes a plurality of ground-engaging feet mounted on the outside of the generally rectangular plate for engaging the ground surface on which the liftgate platform is resting.

Another object of the present invention is to provide a protective liftgate cover which has a generally convex cross-sectional shape to allow space between the plate and the face of the platform for a molded logo or the like formed in the plate.

Another object of the present invention is to provide a protective liftgate cover which is constructed of ABS plastic coated with a polymer extruded acrylic film which will provide substantial protection from scrapes, gouges and discolorations caused by contact with foreign objects and exposure to ultraviolet rays.

Finally, an object of the present invention is to provide a protective liftgate cover which is relatively simple to manufacture and safe and efficient in use.

SUMMARY OF THE INVENTION

The present invention provides a protective liftgate cover for covering and protecting the ground-engaging lower face of a liftgate platform. The cover includes a generally rectangular plate having outer and inner faces, a top edge, lower edge and two side edges, the plate being of a size and shape to fit over and generally completely cover the lower face of the liftgate platform. Mounted adjacent the lower edge of the plate is a lower flange which descends at an angle from the plate for contacting a lower edge of the liftgate platform, thereby assisting in mounting the cover on the liftgate platform and acting to protect the lower edge of the platform. At least one side flange is mounted on the plate adjacent to one of the side edges, the side flange extending perpendicular to the plate for contacting a side edge of the liftgate platform thereby further assisting in mounting the cover on the liftgate platform.

At least one ground-engaging foot is mounted on the outer face of the plate for contacting and engaging the ground surface over which the liftgate platform is being lowered. Finally, one or more fastening devices such as plastic push-type fasteners are used to secure the protective liftgate cover on the lower face of the liftgate platform.

The present invention thus provides a liftgate cover which is superior to anything found in the prior art. The size and shape of the liftgate cover acts to completely protect the lower face of the liftgate platform. Also, the lower flange and side flanges act to seat the plate on the liftgate platform quickly and easily, thereby decreasing installation time and, if necessary, replacement time. Furthermore, the ground-engaging feet operate to provide a stable platform for the liftgate to rest upon while further preventing damage to the generally rectangular plate which would be caused by contact with the ground surface. It is thus seen that the present invention provides a substantial improvement over those protective liftgate covers found in the prior art.

BRIEF DESCRIPTION OF THE DRAWINGS

FIG. 2 is a front elevational view of the protective liftgate cover;

FIG. 3 is a side sectional elevational view of the protective liftgate cover exhibiting the generally convex cross-sectional shape;

DESCRIPTION OF THE PREFERRED EMBODIMENT

Figure 1:
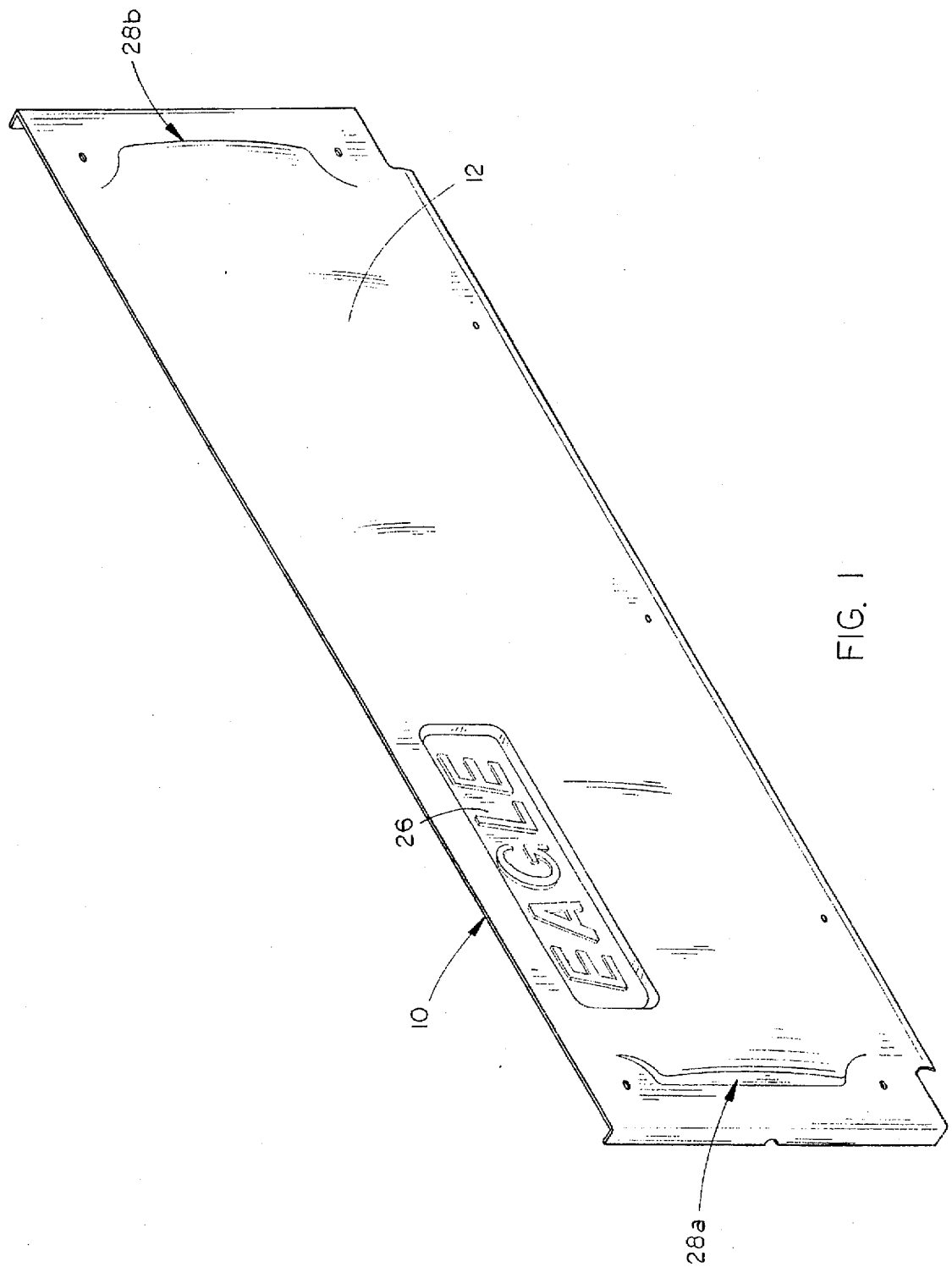
FIG. 1 is a perspective view of the protective liftgate cover of the present invention.
Figure 4:
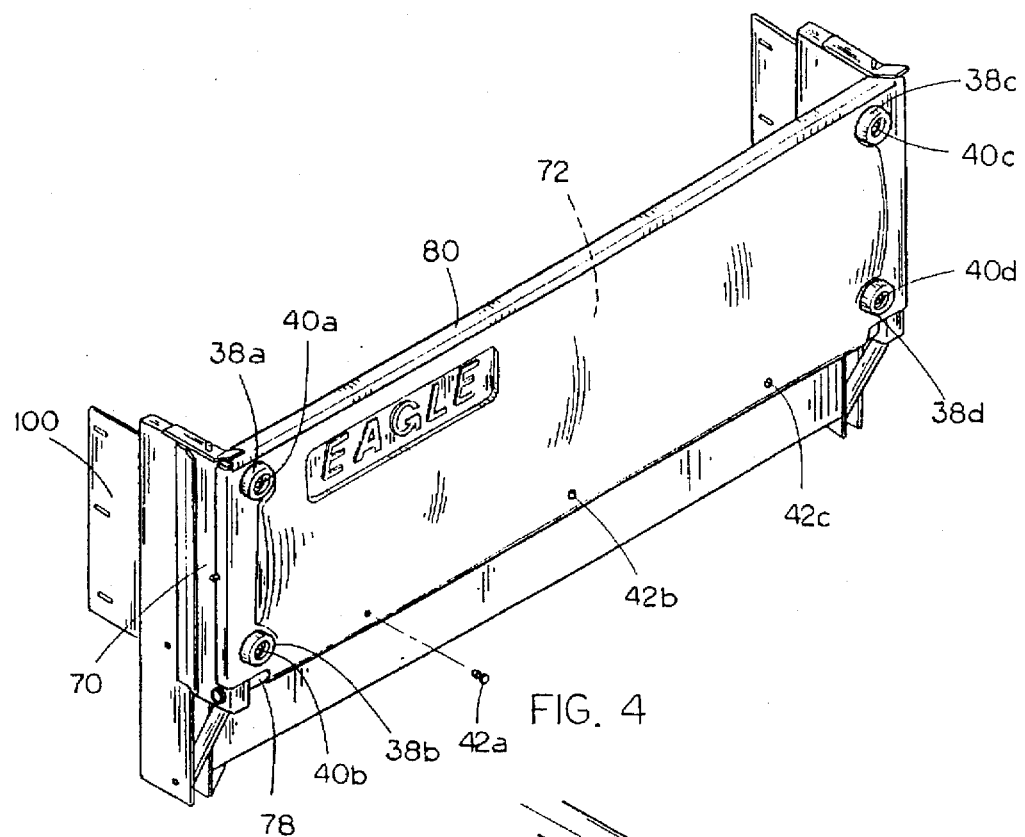
FIG. 4 is a perspective view of the protective liftgate cover of the present invention mounted on a liftgate platform with the liftgate in a raised position.
Figure 5:
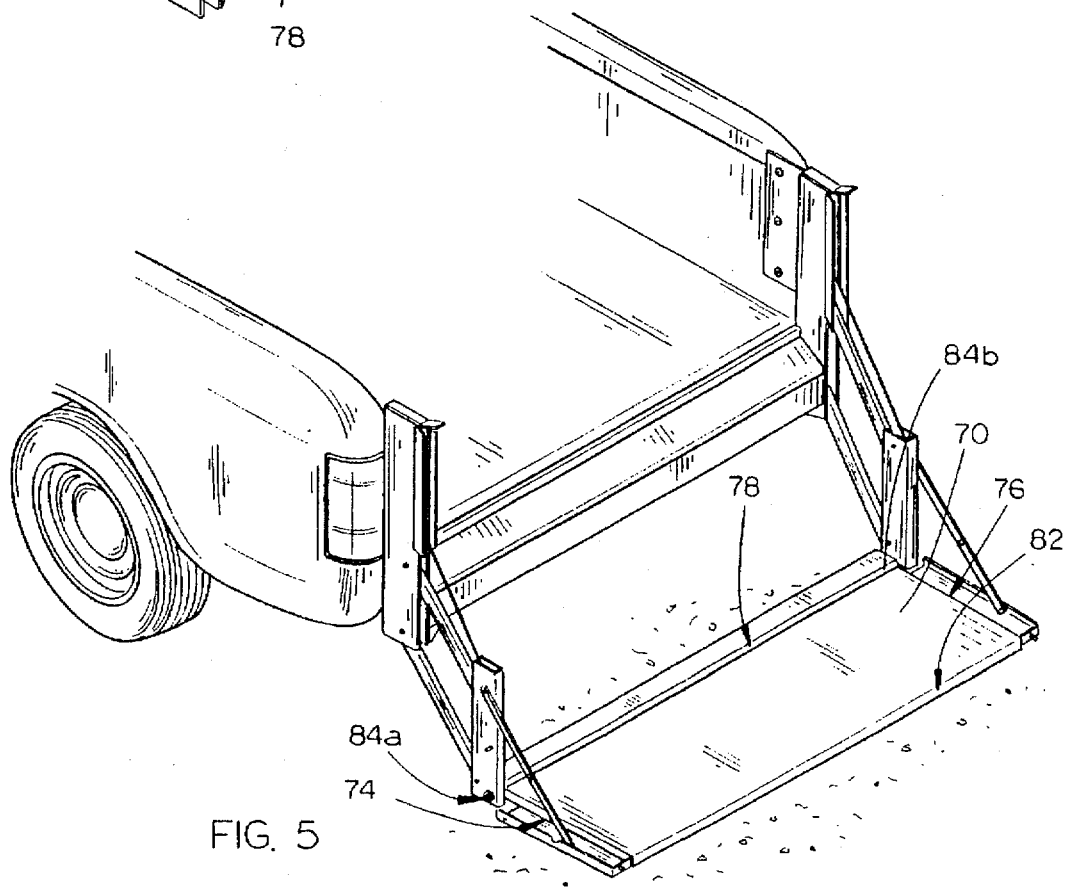
FIG. 5 is a perspective view of the protective liftgate cover of the present invention mounted on a liftgate platform with the liftgate platform lowered to the ground, exhibiting how the protective liftgate cover protects the liftgate platform's lower surface.

The protective liftgate cover 10 of the present invention is best show in FIGS. 1–3 as including a generally rectangular plate 12 which includes an outer face 14, inner face 16, a top edge 18, lower edge 20, and two side edges 22 and 24. In the preferred embodiment, the plate 12 would be of sufficient length and width to completely cover the lower face 72 of a liftgate platform 70 and therefore the dimensions of plate 12 would be defined by the length and width of the liftgate platform 70 on which the plate 12 is to be mounted. It is expected, however, that the plate 12 would have a width as measured parallel with top edge 18 of between 50 inches and 80 inches and a height as measured parallel with the left and right side edges 22 and 24 of between 15 inches and 25 inches. Of course, the size of plate 12 may be modified to accommodate various sized liftgates.

As shown best in FIG. 3, plate 12 preferably has a generally arcuate cross-sectional shape such that the center of plate 12 is spaced from the lower face 72 of the liftgate platform 70 when the plate 12 is affixed on the platform. The main purpose for providing this convex arc in plate 12 is to provide sufficient space between plate 12 and the lower face 72 of the liftgate platform 70 to have a molded logo 26 formed in plate 12. In the preferred embodiment, the logo 26 and the plate 12 would be formed by standard vacuum molding processes in which a mold is produced which includes both the plate and the company's logo. In this manner, the plate 12 and the logo 26 are formed as a single unit, thus increasing the structural integrity of the plate 12. After the molding process is finished, the convex arc in plate 12 allows the plate to be seated on the liftgate platform 70 without the logo 26 interfering with the mounting process. Of course, the logo 26 may also be formed separately from the plate 12, with the logo 26 being slid into an opening on plate 12 having the specific dimensions of the molded logo 26. The molded logo 26 and plate 12 would then be heat fused to one another, thereby forming an integral connection. It is expected that a typical size for the molded logo 26 would be approximately 18 inches in width, four inches in height, and less than one inch in depth. It is preferable, however, to form the entire liftgate cover 10 from a single mold, and such production is well within the scope of the present invention. Furthermore, it may be desirable to modify the arcuate shape to a different cross-sectional shape, so long as sufficient space is provided between the plate 12 and lower face 72 for the molded logo 26.

Plate 12 may also include molded contour features 28a and 28b, shown best in FIGS. 1 and 2. The molded contour features 28a and 28b are preferably formed in plate 12 each adjacent a respective one of the side edges 22 and 24 and are contoured such that the arcuate shape of plate 12 is substantially eliminated as the proximity to left and right side edges 22 and 24 increases. The left and right side edges 22 and 24 thus may be generally flat and straight to provide a better fit to the contours of the liftgate platform 70.

Mounted on left and right side edges 22 and 24 are left and right side flanges 30 and 32, each of which extended generally perpendicularly inwards from plate 12 to fit onto and over the side edges 74 and 76 of liftgate platform 70. It is preferred that left and right side flanges 30 and 32 extend the entire width of plate 12 and have a height of between one-half inch and one inch. The left and right side flanges 30 and 32 each act to prevent dirt, rocks, mud, etc., from lodging between the plate 12 and liftgate platform 70, and further assist in installation of the protective liftgate cover 10 on liftgate platform 70 by acting to guide the protective liftgate cover 10 onto platform 70. The left and right side flanges 30 and 32 thus provide protection for left and right side edges 74 and 76 of liftgate platform 70.

Mounted on and angled inwards from plate 12 is lower flange 34 which preferably consists of a rectangular tab having a width as measured parallel with the lower edge 20 of plate 12 of approximately four inches to ten inches less than the length of lower edge 20 and a height as measured parallel with left and right side edges 22 and 24 of approximate one inch to two inches. Lower flange 34 angles inwards from plate 12 to contact lower edge 78 of liftgate platform 70, and it is preferred that the angle between lower flange 34 and plate 12 be between ten degrees and thirty degrees. It is preferred that lower flange 34 not extend across the entire width of lower edge 20 in order to facilitate placement of the protective liftgate cover 10 on the liftgate platform 70. Also, the hinge connection points of the liftgate platform 70 to the liftgate unit 100 are often found at the lower edge 78 of liftgate platform 70 adjacent the left and right side edges 74 and 76 or precisely where hinge notches 36a and 36b are found on plate 12. The inclusion of hinge notches 36a and 36b thus allows the protective liftgate cover 10 to be mounted on the liftgate platform 70 without interfering with the operation of liftgate platform 70 and liftgate unit 100.

Mounted on the outer face 14 of plate 12 are a plurality of ground-engaging feet 38a, 38b, 38c, and 38d which, in the preferred embodiment, would be mounted adjacent the four corners of plate 12. In the preferred embodiment, the ground-engaging feet 38a–d would be constructed of cylindrical rubber stoppers secured to the plate 12 by bolts 40a–d, the ground-engaging feet 38a–d acting to prevent the outer face 14 of plate 12 from contacting the ground surface over which the liftgate platform 70 is being lowered. Of course, the width and dimensions of the ground-engaging feet 38a–d may be varied so long as they serve the main purpose of providing protection for the outer face 14 of plate 12 and of providing a stable resting surface for the liftgate platform 70.

The protective liftgate cover 10 of the present invention is mounted on the liftgate platform 70 in the following manner. Most commonly used liftgate platforms 70 include a top L-shaped bracket 80 which acts to protect the top edge 82 of the liftgate platform 70 from contact with the ground surface or from objects being slid onto the liftgate platform 70. When the protective liftgate cover 10 is placed adjacent to the lower face 72 of liftgate platform 70, the top edge 18 of plate 12 is slid between lower face 72 of liftgate platform 70 and one leg of the L-shaped bracket 80 adjacent top edge 82 of liftgate platform 70. In this manner, the top edge 18 of plate 12 is secured adjacent top edge 82 of liftgate platform 70. As the size of plate 12 corresponds to the size of lower face 72 of liftgate platform 70, the left and right side flanges 30 and 32 overhang and protect left and right side edges 74 and 76 of liftgate platform 70 and lower flange 34 of plate 12 overhangs and protects lower edge 78 of liftgate platform 70 without interfering with the operation of hinges 84a and 84b on the liftgate unit 100. To secure the lower edge 20 of plate 12 on lower face 72 of liftgate platform 70, a plurality of plastic push-type fasteners 42a, 42b and 42c, extend through plate 12 adjacent lower edge 20 and through lower face 72 of liftgate platform 70, and are secured by pressing through holes (not shown) formed in the lower face 72 of liftgate platform 70. A typical plastic push-type fastener would resemble a wood screw, having a head and a depending shank. However, instead of the shank being threaded, it would include a series of concentric parallel ridges each angled upwards towards the head of the fastener. When the fastener is inserted into a hole having a diameter slightly less than the diameter of the ridges, as each ridge enters the hole, it deforms and permits the shank to enter farther into the hole. The angled nature of the ridge prevents the fastener from being easily withdrawn from the hole, thus securing the fastener within the hole. Of course, any other type of securement means may be used to secure plate 12 to the lower face 72 of liftgate platform 70 but it has been found that this type of fastener securement is both easy and effective. Following securement of fasteners 42a–c and the sliding of top edge 18 of plate 12 underneath L-shaped bracket 80, the protective liftgate cover 10 is securely mounted on the liftgate platform 70 thus providing protection for the lower face 72 thereof.

In the preferred embodiment, the protective liftgate cover 10 of the present invention would be constructed of LUS-TRAN® ABS plastic, manufactured by Monsanto, which is a hard, semi-flexible plastic which is extremely durable and weather-resistant, and is very resistant to scratching and disfiguring. It is further preferred that the ABS plastic be coated by an acrylic film such as KORAD® for further protection, although other plastics and acrylic films could be used in construction of the present invention.

It is to be understood that numerous modifications, additions and substitutions may be made to the protective liftgate cover 10 of the present invention without falling outside the intended broad scope of the appended claims. For example, the liftgate cover 10 may be constructed of different types of polymer extruded products, so long as those products retain the protective characteristics of the above-described construction materials. Also, the dimensions and thicknesses of the various features of the cover 10 may be varied to accommodate different sized liftgate platforms. Finally, the liftgate cover 10 may be secured to the liftgate platform 70 in many different manners, any of which would be understood by one skilled in the art.

There has thus been shown and described a protective liftgate cover which accomplishes at least all of the stated objectives.

I claim:

1. A protective liftgate cover for covering and protecting the ground-engaging lower face of a liftgate platform, said cover comprising:

a generally rectangular plate having outer and inner faces, a top edge, lower edge, two side edges and longitudinal and transverse axes, said plate being of a size and shape to fit over and generally completely cover a lower face of a liftgate platform;

a lower flange mounted on said plate adjacent said lower edge, said lower flange depending at an angle from said plate for contacting a lower edge of a liftgate platform thereby assisting in mounting said cover on a liftgate platform and protecting a lower edge of a liftgate platform;

at least one side flange mounted on said plate adjacent one of said side edges, said side flange extending generally perpendicular to said plate for contacting a side edge of a liftgate thereby assisting in mounting said cover on a liftgate platform and protecting a side edge of a liftgate platform;

at least one ground-engaging foot mounted on said outer face of said plate for contacting and engaging a ground surface upon lowering of a liftgate platform on which said cover is mounted; and fastening means operative to secure said protective liftgate cover on a liftgate.

2. The protective liftgate cover of claim 1 wherein said plate further comprises a generally arcuate convex cross-sectional shape such that upon said cover being mounted on a liftgate platform, a section of said plate is spaced from the lower face of the liftgate platform.

3. The protective liftgate cover of claim 1 further comprising at least one hinge notch on said cover wherein said lower edge of said plate is of greater length than the length of said lower flange thereby forming said hinge notch, said cover being mounted on a liftgate platform free of interference with the operation of the liftgate platform and liftgate unit.

4. The protective liftgate cover of claim 1 further comprising two side flanges mounted on and extending generally perpendicular to said plate, one of said side flanges mounted adjacent one of said side edges of said plate and the other of said side flanges mounted adjacent the other of said side edges of said plate whereby each side edge of a liftgate platform may be protected by one of said side flanges.

5. The protective liftgate cover of claim 1 wherein said liftgate cover is constructed of LUSTRAN® ABS plastic, said cover further comprising a coating over said plastic, said coating consisting of an acrylic film.

6. The protective liftgate cover of claim 1 further comprising a molded logo integrally formed on said cover for displaying the logo of the organization distributing said cover.

7. The protective liftgate cover of claim 1 wherein said at least one ground-engaging foot comprises a generally cylindrical rubber stopper mounted on said plate.

8. In combination:

a liftgate unit comprising a mounting structure, a liftgate platform having an upper face and a ground-engaging lower face, side edges, a lower edge, a top edge and an L-shaped bracket mounted adjacent said top edge and a lifting device for raising and lowering said platform, and a protective liftgate cover for covering and protecting said ground-engaging lower face of said liftgate platform, said cover comprising:

a generally rectangular plate having outer and inner faces, a top edge, lower edge, two side edges and longitudinal and transverse axes, said plate being of a size and shape to fit over and generally completely cover said lower face of said liftgate platform;

a lower flange mounted on said plate adjacent said lower edge, said lower flange depending at an angle from said plate for contacting said lower edge of said liftgate platform thereby assisting in mounting said cover on said liftgate platform and protecting said lower edge of said liftgate platform;

at least one side flange mounted on said plate adjacent one of said side edges, said side flange extending generally perpendicular to said plate for contacting one of said side edges of said liftgate platform thereby assisting in mounting said cover on said liftgate platform and protecting one of said side edges of said liftgate platform;

at least one ground-engaging foot mounted on said outer face of said plate for contacting and engaging a ground surface upon lowering of said liftgate platform on which said cover is mounted; and fastening means operative to secure said protective liftgate cover on said liftgate platform.

9. The combination of claim 8 wherein said plate further comprises a generally arcuate convex cross-sectional shape, a center section of said plate raised above said top and lower edges such that upon said cover being mounted on said liftgate platform, said center section of said plate is spaced from said lower face of said liftgate platform.

10. The combination of claim 8 further comprising at least one hinge notch on said cover wherein said lower edge of said plate is of greater length than the length of said lower flange thereby forming said hinge notch, said cover being mounted on said liftgate platform free of interference with the operation of said liftgate platform and liftgate unit.

11. The protective liftgate cover of claim 8 further comprising two side flanges mounted on and extending generally perpendicular to said plate, one of said side flanges mounted adjacent one of said side edges of said plate and the other of said side flanges mounted adjacent the other of said side edges of said plate whereby each side edge of said liftgate platform may be protected by one of said side flanges.

12. The combination of claim 8 wherein said liftgate cover is constructed of LUSTRAN® ABS plastic, manufactured by Monsanto, said cover further comprising a coating over said plastic, said coating consisting of an acrylic film.

13. The combination of claim 8 further comprising a molded logo integrally formed on said cover for displaying the logo of the organization distributing said cover.

14. The combination of claim 8 wherein said at least one ground-engaging foot comprises a generally cylindrical rubber stopper mounted on said plate.

15. The combination of claim 8 wherein said fastening means comprises a plurality of plastic push-type fasteners, said fasteners each including a head and a depending shank having a series of concentric parallel ridges each angled upwards towards the head of said fastener.

* * * * *